US005454076A

United States Patent [19]

Cain et al.

[11] Patent Number: 5,454,076

[45] Date of Patent: Sep. 26, 1995

[54] METHOD AND APPARATUS FOR SIMULTANEOUSLY MINIMIZING STORAGE AND MAXIMIZING TOTAL MEMORY BANDWIDTH FOR A REPEATING PATTERN

[75] Inventors: Bradley W. Cain, Mesa; Rajeev Jayavant; William D. Rhoden, both of Phoenix, all of Ariz.

[73] Assignee: VLSI Technology, Inc., San Jose, Calif.

[21] Appl. No.: 204,828

[22] Filed: Mar. 2, 1994

[51] Int. Cl.$^6$ .......... G06F 12/00

[52] U.S. Cl. .......... 395/164; 395/401; 345/185

[58] Field of Search .......... 395/162–166, 395/425; 345/27, 185, 196, 189, 201, 203, 190

[56] References Cited

U.S. PATENT DOCUMENTS 5,131,080 7/1992 Fredrickson et al. .......... 395/164

OTHER PUBLICATIONS

Richard F. Ferraro, *Programmer's Guide to the EGA and VGA Cards,* Addison–Wesley Publishing Company, Inc., 1990, pp. 182–227.

James D. Foley, et al., *Computer Graphics Principles and Practice,* Addison–Wesley Publishing Company, Inc., 1987, pp. 164–187.

*Primary Examiner*—Mark R. Powell
*Assistant Examiner*—Kee M. Tung
*Attorney, Agent, or Firm*—Douglas L. Weller

[57] ABSTRACT

An image is written to a data frame buffer for display by a monitor. The image includes a repeated pattern. The present invention uses a repeated pattern cache which is not large enough to simultaneously contain an entire repeated pattern. When writing a pixel of the image, a horizontal pattern offset and a vertical pattern offset for a destination location of the pixel are determined. If a scan line for the repeated pattern which corresponds to the vertical pattern offset does not reside in the repeated pattern cache, the scan line for the repeated pattern which corresponds to the vertical pattern offset is fetched into the repeated pattern cache. When the scan line for the repeated pattern which corresponds to the vertical pattern offset resides in the repeated pattern cache, the pixel is accessed at a location in the repeated pattern cache at a location which corresponds to the horizontal pattern offset. The accessed pixel is written to the buffer.

14 Claims, 5 Drawing Sheets

METHOD AND APPARATUS FOR SIMULTANEOUSLY MINIMIZING STORAGE AND MAXIMIZING TOTAL MEMORY BANDWIDTH FOR A REPEATING PATTERN

BACKGROUND

The present invention concerns a graphics controller for a computer, and more specifically, a cache for a raster operation unit (ROP) which is used to store a scan line of a pattern tile.

In a computer display system in which a graphics controller is used in the display of information on a video monitor, the graphics controller is typically called on to display various repeated patterns, also referred to herein as tile patterns. In some graphics controllers, no internal storage is provided for a repeated pattern. In such a case, the device driver software performs all patterning operations. This solution, however, can result in poor display performance. Additionally, a significant software development and maintenance effort may be required.

In an alternate solution, a minimal amount of repeated pattern support may be implemented in hardware without adding any local storage for the pattern data within the graphics controller. The complete pattern is stored in the frame buffer memory. Each frame buffer write from a raster operation unit to a frame buffer memory is preceded by an operation to read pattern data from non-displayed memory locations within the frame buffer memory. While such a system reduces the software driver development effort, the frequent pattern read operations from the frame buffer memory consume a significant percentage of the total memory bandwidth. The overall performance of the repeat pattern operations remains fairly low.

In another alternate solution, memory within the controller is provided which stores an entire pattern. This allows for display of information integrated within a pattern at virtually the same performance as the display of information not integrated in a pattern. While this approach provides very high performance, storing the complete pattern requires a significant hardware investment within the controller. However, the solution does have the advantage of minimizing software driver support as it only requires loading a pattern from unused portions of the frame buffer whenever the pattern changes. Alternately, the pattern may be stored elsewhere in the computer system, such as system memory or in the CPU.

SUMMARY OF THE INVENTION

In accordance with the preferred embodiment of the present invention, a method and circuitry are provided for writing an image to a data frame buffer for display by a monitor. The image includes a repeated pattern. The present invention uses a repeated pattern cache which is not large enough to simultaneously contain an entire repeated pattern. When writing a pixel of the image, a horizontal pattern offset and a vertical pattern offset for a destination location of the pixel are determined. If a scan line for the repeated pattern which corresponds to the vertical pattern offset does not reside in the repeated pattern cache, the scan line for the repeated pattern which corresponds to the vertical pattern offset is fetched into the repeated pattern cache. When the scan line for the repeated pattern which corresponds to the vertical pattern offset resides in the repeated pattern cache, the pixel is accessed at a location in the repeated pattern cache at a location which corresponds to the horizontal pattern offset. The accessed pixel is written to the buffer.

In the preferred embodiment of the present invention, the horizontal pattern offset is determined using the following equation:

$$px=(x+a)\,modulo\;m$$

where px is the horizontal pattern offset, x is the x-coordinate for the destination location, a is the horizontal display offset for the repeated pattern and m is the width of the repeated pattern. Also in the preferred embodiment of the present invention, the vertical pattern offset is determined using the following equation:

$$py=(y+b)\,modulo\;n$$

where py is the vertical pattern offset, y is the y-coordinate for the destination location, b is the vertical display offset for the repeated pattern and n is the height of the repeated pattern.

The present invention offers superior performance over prior systems where no pattern support is offered or where each frame buffer write from a raster operation unit to a frame buffer memory is preceded by an operation to read pattern data from non-displayed memory locations within the frame buffer memory. However, the present invention does not have the high hardware investment required for systems in which memory within the controller is provided which stores an entire pattern.

DESCRIPTION OF THE PREFERRED EMBODIMENT

Figure 1:
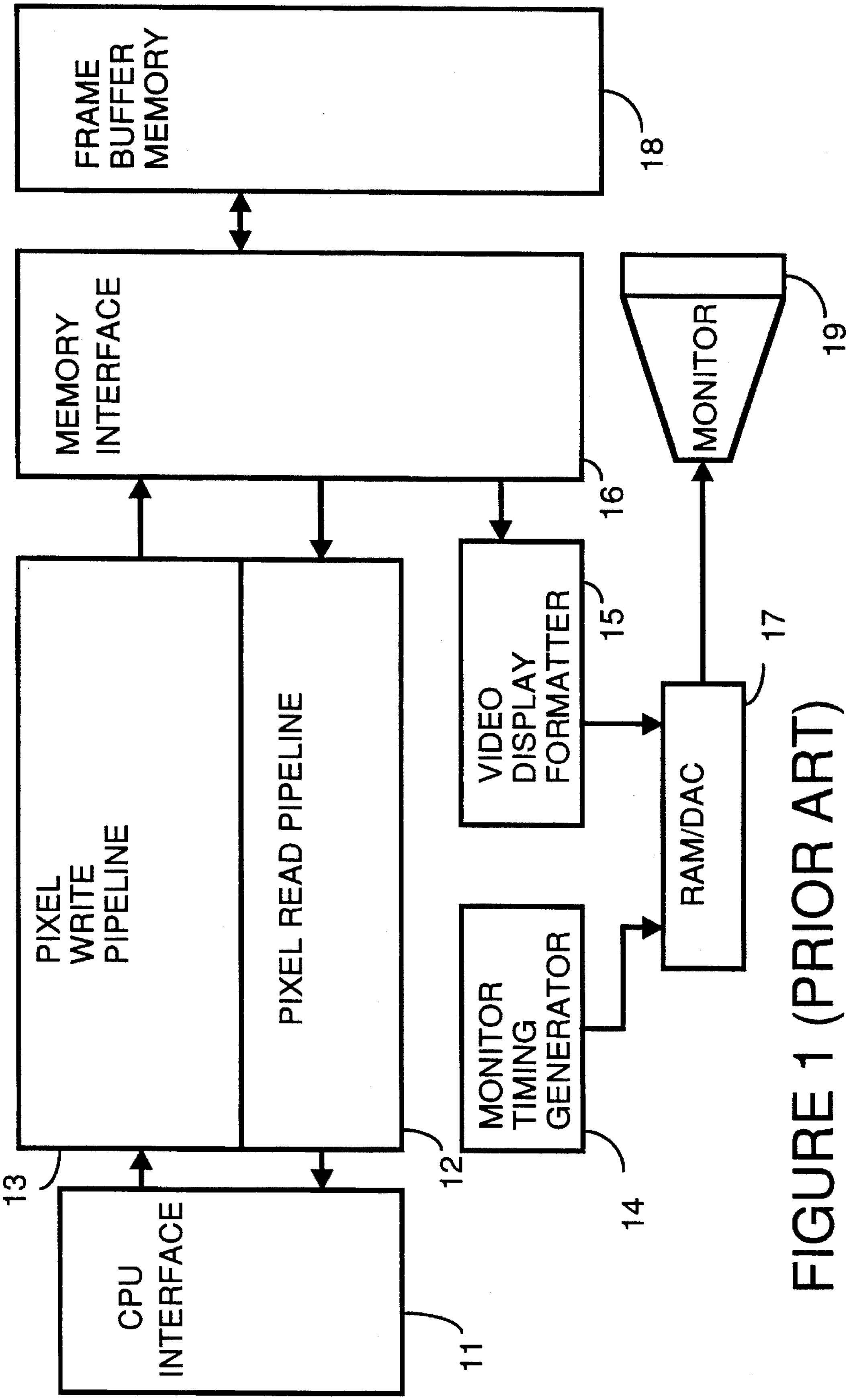
FIGURE 1 (PRIOR ART)
FIG. 1 shows implementation of a display system in accordance with the prior art.

FIG. 1 shows implementation of a display system in accordance with the prior art. A frame buffer memory 18 buffers information which describes a screen displayed on a monitor 19. In addition, in "off-screen" portions of frame buffer memory 18 not used for screen description, pattern information is stored. This information may be used by a pixel write pipeline when preparing description of the screen to be stored in frame buffer memory 18.

A CPU interface 11 is used to interface the display system with the central processor system (CPU). When the CPU changes the screen description information within frame buffer memory 18, software drivers running on the CPU forward new screen display information to the display system through CPU interface 11. This new screen display information typically includes pixel data directly written through to frame buffer memory 18. Alternately, more sophisticated systems may provide a co-processor to accelerate drawing operations. The number of bits per pixel and number of pixels per write varies dependent upon the particular configuration. From the new screen display information, a pixel write pipeline 13 writes new screen description into frame buffer memory 18. All interaction between pixel write pipeline 13 and frame buffer memory 18 is done through a memory interface 16.

The information within frame buffer memory may also be accessed by a pixel read pipeline 12 through memory interface 16. The information may be forwarded to the CPU through CPU interface 11.

The screen display within frame buffer memory is formatted by a video display formatter 15. Video display formatter 15 receives the pixels from the screen display from frame buffer memory 18 through memory interface 16 as shown in FIG. 1. Alternately, video display formatter may receive the pixels from the screen display directly from frame buffer memory 18 via an optional VRAM serial port (not shown). RAMDAC circuitry 17, which includes RAM and digital to analog converters, generates RGB analog signals which are used to drive monitor 19. In generating the RGB analog signals, RAMDAC circuitry 17 uses synchronization signals generated by a monitor timing generator 14.

Figure 2:
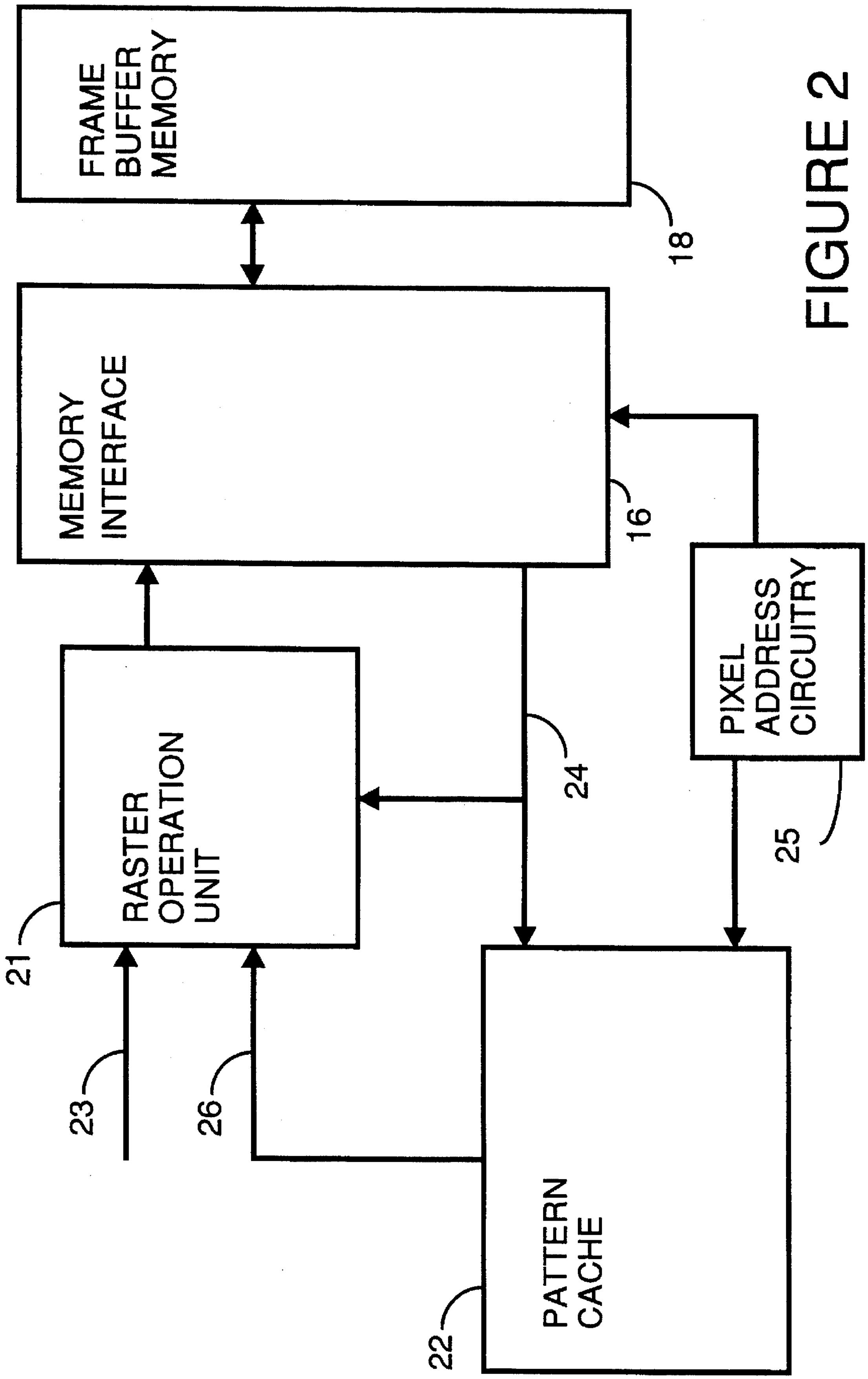
FIG. 2 shows a cache which is used to store a portion of a pattern within the display system shown in FIG. 1.

FIG. 2 shows circuitry within pixel write pipeline 13 used to modify the screen display within frame buffer memory 18 in accordance with the preferred embodiment of the present invention. A raster operation unit (ROP) 21 prepares information to be loaded into the screen display memory locations within frame buffer memory 18. New data from the CPU is received along a pixel write path 23. This information includes pixel data, e.g. color, which is forwarded to ROP 21. Pattern information is sent from pattern cache 22 to ROP 21 through pattern path 26. Through a data path 24 from frame buffer memory 18 via memory interface 16, ROP 21 and pattern cache 22 are able to access data from memory locations within frame buffer memory 18. Generally, data path 24 is used to feed the pixel read pipeline.

Pixel address circuitry 25 keeps track for each pixel of the x/y coordinates where the new data is to be placed in the frame buffer memory. Pixel address circuitry 25 forwards the current pixel address to pattern cache 22 and memory interface 16.

Figure 5:
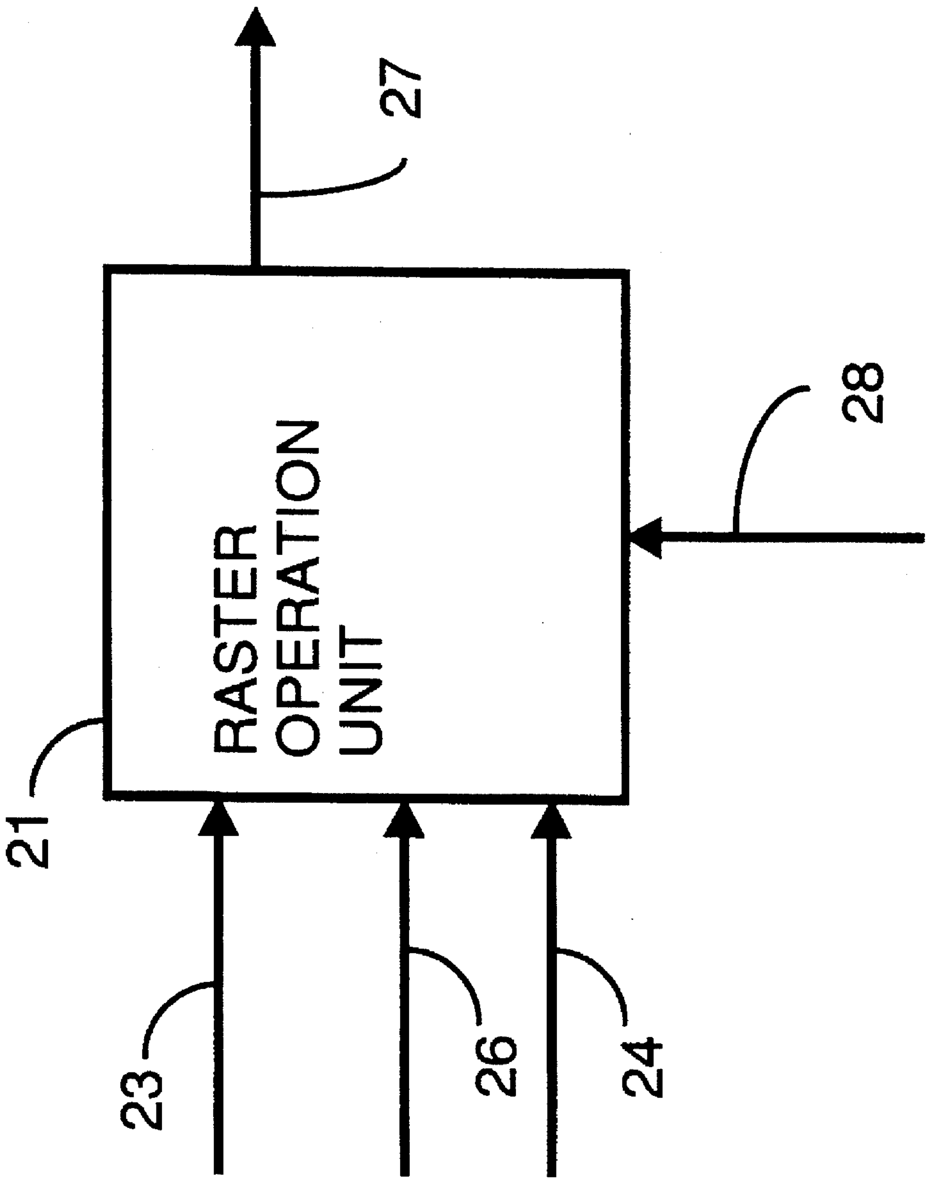
FIG. 5 shows a block diagram illustrating operation of the raster operation unit shown in FIG. 2 in accordance with the preferred embodiment of the present invention.

FIG. 5 is a block diagram which illustrates operation of ROP 21. Each pixel is represented by "B" bits of data. The number of bits per pixel (B) may equal, for example, 8, 16 or 24. For each pixel of data, ROP 21 receives B-bits of source information through pixel write path 23, B-bits of pattern information from pattern cache 22 through pattern path 26, and B-bits of destination information through data path 24. A B-bit output is produced on ROP output lines 27.

ROP 21 generates each bit of output using a corresponding bit from each of the source information, the pattern information and the destination information. An ROP code on ROP code input lines 28 is used to determine how the corresponding bit from each of the source information, the pattern information and the destination information are combined to generate each output bit. For example, for a first ROP code, the output bit may always be zero. For a second ROP code, the output may be generated by performing a logic NOR on the corresponding source information bit and the destination information bit. For a third ROP code, the output may be generated by performing a logic AND on the corresponding destination information bit and the inverted source information bit. And so on.

When there is no repeated pattern used for the current pixel memory location destination within frame buffer memory 18, the output generated by raster operation unit 21 does not utilize pattern information to generate the output. When a repeated pattern is used to generate a pixel value for the current pixel memory location destination within frame buffer memory 18, raster operation unit 21 uses pattern information from pattern cache 22.

Figure 3:
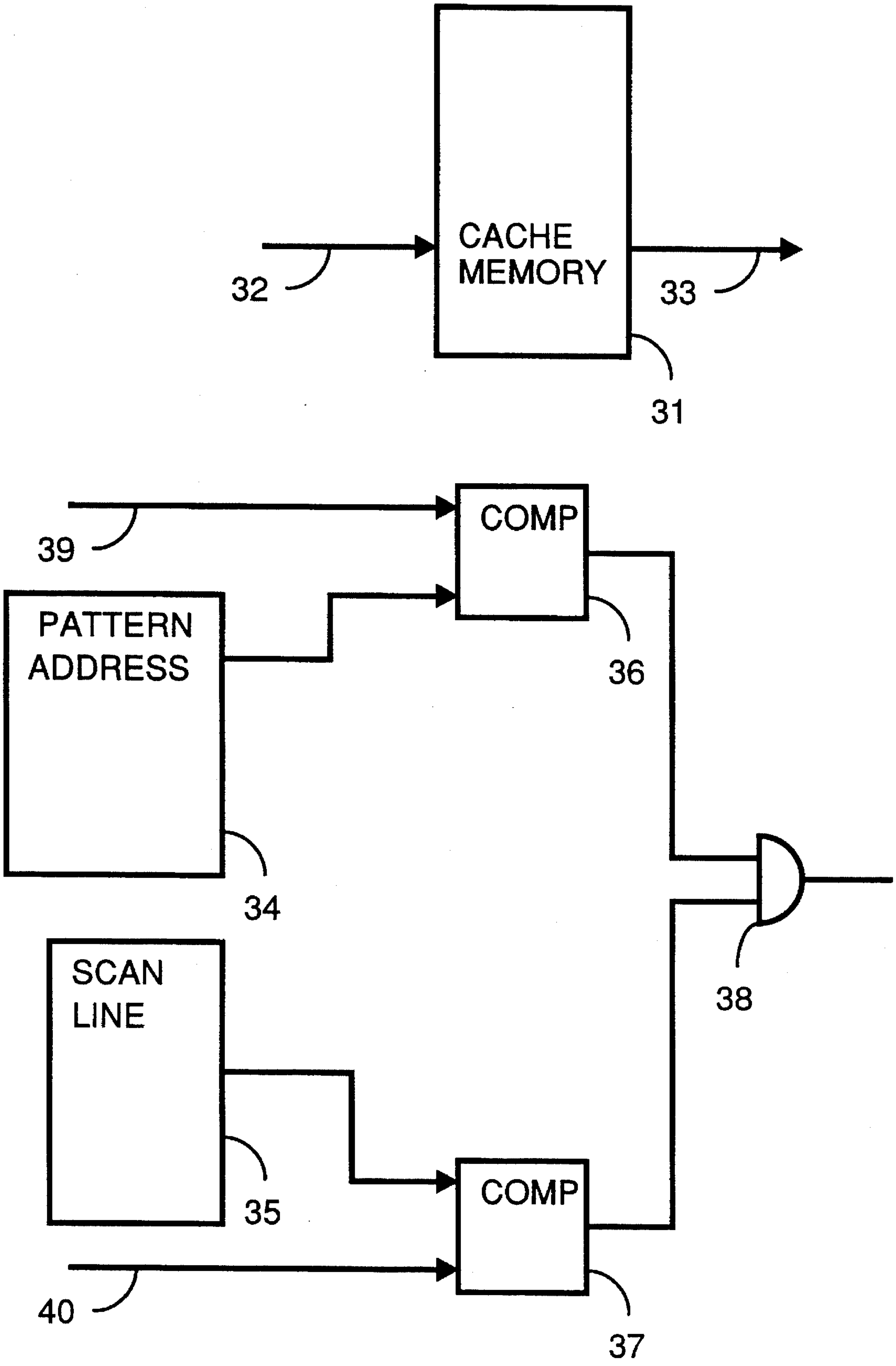
FIG. 3 shows a block diagram of the cache shown in FIG. 2 in accordance with the preferred embodiment of the present invention.

FIG. 3 is a logic block diagram illustrating functioning of pattern cache 22. Within pattern cache 22, a cache memory 31 stores a scan line of a pattern. For example, each pixel is described by "B" bits. The pattern stored in frame buffer memory 18 is "m" pixels wide and "n" pixels high.

Using the above notation, cache memory 31, in order to store a scan line of the pattern, needs to be able to store m times B bits. Pixels of the scan line within cache memory 31 are accessed from input 32 by the horizontal pattern offset "px". The horizontal pattern offset px represents the horizontal offset within the pattern. For example, for a scan line of a pattern which has eight pixels, the left most pixel will have a horizontal pattern offset px equal to 0. For a scan line of a pattern which has eight pixels, the right most pixel will have a horizontal pattern offset px of 7. And so on.

For example, the pixel coordinates for a current pixel to be displayed in a display screen is given by (x,y). When the pattern of dimensions m by n starts at coordinate (0,0), the horizontal pattern offset px for any coordinate (x,y) can be determined by the following Equation 1 below:

Equation 1

$$px = x \text{ modulo } m$$

The result of the operation "modulo" is equal to the remainder after a division.

More generally, where the pixel coordinates for a pixel in a display screen is given by (x,y), and the pattern of dimensions m by n has a logical origin at coordinate (a,b), the horizontal pattern offset px for any coordinate (x,y) can be determined by the following Equation 2 below:

Equation 2

$$px = (x+a) \text{modulo } m$$

In order to determine whether a pixel obtained from cache memory 31 is valid, two comparisons need to be made. First, a pattern address received from the CPU and placed on input 39 is compared by a comparator 36 with a pattern address stored in a register 34. The pattern address stored in register 34 indicates the pattern address within frame buffer memory 18 from which originated the scan line currently residing in cache memory 31. If the comparison does not yield a match, a new scan line from the correct pattern must be fetched from frame buffer memory 18 to cache memory 31. In an alternate embodiment, the cache is invalidated whenever a pattern address is written.

Second, a current pattern scan line in a scan line register 35 is compared by a comparator 37 with the vertical pattern offset py of the coordinate to be displayed, which is placed on an input 40. When the pattern of dimensions m by n starts at coordinate (0,0), the vertical pattern offset py for any coordinate (x,y) can be determined by the following Equation 3 below:

Equation 3

$$py = y \text{ modulo } n$$

More generally, where the pixel coordinates for a pixel in a display screen is given by (x,y), and the pattern of dimensions m by n has a logical origin at coordinate (a,b), the vertical pattern offset py for any coordinate (x,y) can be determined by the following Equation 4 below:

Equation 4

$$py=(y+b)\,modulo\ n$$

If both comparisons of pattern address and scan lines indicate there is a cache hit, a logic AND gate 38 generates a hit signal indicating the value on output 33 is valid. Otherwise, logic AND gate 38 generates a miss signal and the correct scan line is fetched from frame buffer memory 18 into cache memory 31. Alternately, the cache may be invalidated whenever the pattern address is written, thereby reducing hardware requirements for the system.

Figure 4:
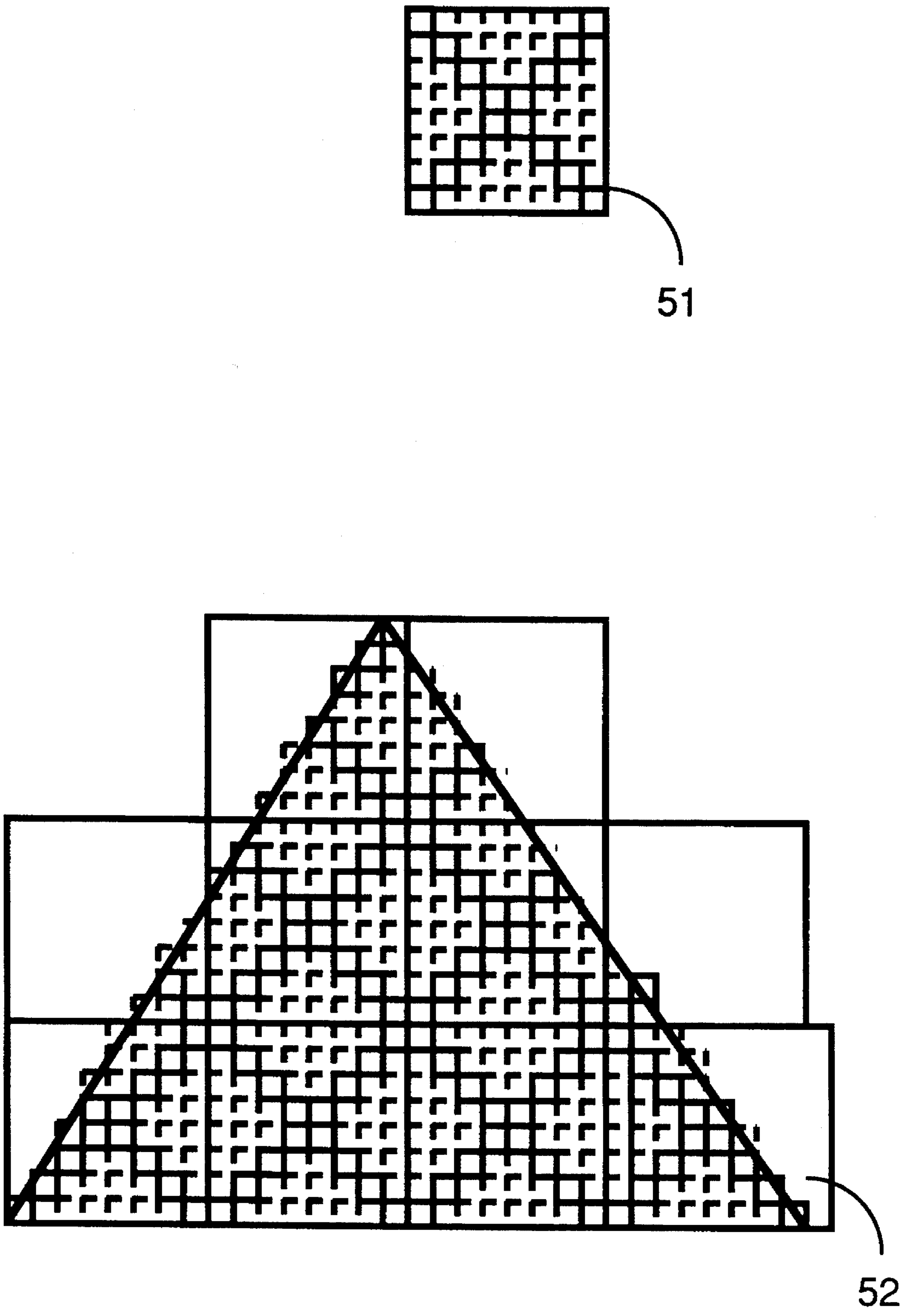
FIG. 4 shows an example of a pattern tile and an image which utilizes the pattern tile.

For example, FIG. 4 shows an eight pixel by eight pixel repeated pattern 51 stored in frame buffer memory 18. In response to direction from the CPU, ROP 21 uses pattern 31 to draw the triangle shown in display portion 32. In the preferred embodiment, single pattern scan line (consisting of eight pixels) is loaded into pattern cache 22 from off screen memory locations within frame buffer memory 18. By way of contrast, a horizontal screen scan line is typically 1024–1280 pixels wide. Most graphics rendering algorithms are scan line oriented. This means that the graphics rendering algorithms tend to draw objects as a collection of horizontal bands, completing one band before moving on the next. Thus the triangle within display portion is drawn left to right, top to bottom. The top horizontal scan line of the triangle includes only a single pixel. The second horizontal scan line of the triangle includes two pixels. The third horizontal scan line of the triangle includes four pixels. The fourth horizontal scan line of the triangle includes five pixels. The fifth horizontal scan line of the triangle includes six pixels. And so on.

Pattern cache 22 reads in a single pattern scan line prior to drawing one line of the triangle. The "cached" pattern data can then be repeatedly used to draw pixels within that triangle line. Since the triangle is twenty-four scan lines high, pattern cache 22 has to reload a total of 24 times. If pattern cache 22 is reloaded one pixel at a time, this would result in 192 reads. If pattern cache 22 is reloaded four pixels at a time, this would result in 48 reads. As may be understood from the above discussion, when drawing the first scan line, the cache data is purged after only a single pixel is drawn at the top of the triangle. In the second scan line, two pixels are drawn before the cache data is purged. At the bottom of the triangle, thirty-one pixels are drawn before the cache data is purged. In addition, seven of the eight pixels within the cache are used four times. The eight pixel is used three times. As is clear from this discussion, performance of the preferred embodiment of the present invention improves as the width of the patterned area increases.

Operation of the preferred embodiment of the present invention offers superior performance over prior art methods of pattern support. Specifically, where no pattern support is offered in hardware, software running on the CPU must look up the pattern data and draw the pattern using the data. This tends to be very slow. Where there is pattern support but no pattern storage, a piece of the pattern must be read from off screen memory in the frame buffer memory before each pixel or set of pixels can be written back to the screen display in the frame buffer. In the triangle example discussed above, there are approximately 384 pixels. Thus a system that accessed pixels one at a time would perform 384 read/write pairs to draw the patterned triangle. If the system could read and write four pixels at a time, a total of 115 read/write pairs would still be required, when alignment restrictions are included. For a system which stored the entire pattern, the pattern would first be written to the graphics controller. Then the triangle can be drawn, resulting in approximately 384 writes if one pixel is written at a time or about 115 writes if four pixels are written at time. This yields superior performance to the preferred embodiment of the present invention, however, as described, such a system requires a significant amount of hardware for implementation.

The description of the example above utilized an eight pixel by eight pixel pattern. As will be understood by persons of ordinary skill in the art, the present invention embodies systems with patterns of any size. However, it is necessary is to insure that cache memory 31 is sufficiently large to hold a scan line of the pattern. Also, the present invention includes embodiments a cache size that would include, for example, two or more (but not all) scan lines of the pattern.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for writing to a buffer for display by a monitor an image which includes a repeated pattern, the method comprising the steps of:

(a) storing in a repeated pattern cache, a scan line for a repeated pattern, the repeated pattern cache not being large enough to simultaneously contain an entire repeated pattern; and, (b) when using the repeated pattern to write a pixel of the image into the buffer, performing the following substeps:

(b.1) determining a horizontal pattern offset and a vertical pattern offset for a destination location of the pixel, (b.2) if a scan line for the repeated pattern which corresponds to the vertical pattern offset does not reside in the repeated pattern cache, discarding current contents of the repeated pattern cache and fetching into the repeated pattern cache the scan line for the repeated pattern which corresponds to the vertical pattern offset, and (b.3) accessing pixel information from the repeated pattern cache at a location which corresponds to the horizontal pattern offset and writing the pixel information to the buffer.

2. A method as in claim 1, wherein in substep (b.1) the horizontal pattern offset is determined using the following equation:

$$px=(x+a)\,modulo\ m$$

where px is the horizontal pattern offset, x is an x-coordinate for the destination location, a is a horizontal display offset for the repeated pattern and m is a width of the repeated pattern.

3. A method as in claim 2, wherein in substep (b.1) the vertical pattern offset is determined using the following equation:

$$py=(y+b)\,modulo\ n$$

where py is the vertical pattern offset, y is a y-coordinate for the destination location, b is a vertical display offset for the repeated pattern and n is a height of the repeated pattern.

4. A method as in claim 1, wherein in substep (b.1) the vertical pattern offset is determined using the following equation:

$$py=(y+b) \text{ modulo } n$$

where py is the vertical pattern offset, y is a y-coordinate for the destination location, b is a vertical display offset for the repeated pattern and n is a height of the repeated pattern.

5. A method as in claim 1, additionally comprising the following step performed before step (a):

(c) storing the repeated pattern in an off screen portion of the buffer.

6. A method as in claim 1, wherein in substep (b.2) the pixel information is combined with source pixel information and destination pixel information before being written to the buffer.

7. Circuitry for writing to a buffer for display by a monitor an image which includes a repeated pattern, the circuitry comprising:

a repeated pattern cache, the repeated pattern cache storing at least a scan line of the repeated pattern but the repeated pattern cache not being large enough to simultaneously contain all of the repeated pattern; and, buffer writing circuitry, coupled to the repeated pattern, the buffer writing circuitry writing the image into the buffer, wherein when the buffer writing circuitry uses the repeated pattern to write a pixel of the image into the buffer, the buffer writing circuitry accesses pixel information from the repeated pattern cache at a location which corresponds to a horizontal pattern offset for a destination location of the pixel;

wherein when a scan line for the repeated pattern which corresponds to a vertical pattern offset for the destination location of the pixel does not reside in the repeated pattern cache, a current scan line within the repeated pattern cache is discarded and the scan line for the repeated pattern which corresponds to the vertical pattern offset is fetched into the repeated pattern cache before the buffer writing circuitry accesses the pixel information from the repeated pattern cache.

8. Circuitry as in claim 7 wherein the buffer contains all the repeated pattern and the repeated pattern cache accesses scan lines of the repeated pattern from the buffer when there is a repeated pattern cache miss.

9. Circuitry as in claim 7 the repeated pattern cache including:

memory which is accessed using the horizontal pattern offset for the destination location of a pixel; and validity checking circuitry which determines whether the scan line for the repeated pattern which corresponds to the vertical pattern offset resides in the repeated pattern cache.

10. Circuitry as in claim 7 wherein the horizontal pattern offset is determined using the following equation:

$$px=(x+a) \text{ modulo } m$$

where px is the horizontal pattern offset, x is an x-coordinate for the destination location, a is a horizontal display offset for the repeated pattern and m is a width of the repeated pattern.

11. Circuitry as in claim 10 wherein the vertical pattern offset is determined using the following equation:

$$py=(y+b) \text{ modulo } n$$

where py is the vertical pattern offset, y is a y-coordinate for the destination location, b is a vertical display offset for the repeated pattern and n is a height of the repeated pattern.

12. Circuitry as in claim 7 wherein the vertical pattern offset is determined using the following equation:

$$py=(y+b) \text{ modulo } n$$

where py is the vertical pattern offset, y is a y-coordinate for the destination location, b is a vertical display offset for the repeated pattern and n is a height of the repeated pattern.

13. Circuitry as in claim 7 wherein the buffer writing circuitry comprises a raster operation unit.

14. Circuitry as in claim 7 wherein the buffer writing circuitry includes means for combining the pixel information with source pixel information and destination pixel information before writing the pixel of the image into the buffer.

* * * * *